United States Patent
Liu et al.

(10) Patent No.: US 8,415,994 B2
(45) Date of Patent: Apr. 9, 2013

(54) INTEGRATED CIRCUIT AND STANDBY CONTROLLING METHOD THEREOF

(75) Inventors: Yonggen Liu, Zhuhai (CN); Jiang Xiong, Zhuhai (CN); Lirong Xiao, Zhuhai (CN)

(73) Assignee: Artek Microelectronics Co., Ltd., Shenzhen (CN)

( * ) Notice: Subject to any disclaimer, the term of this patent is extended or adjusted under 35 U.S.C. 154(b) by 8 days.

(21) Appl. No.: 13/114,807

(22) Filed: May 24, 2011

(65) Prior Publication Data

US 2011/0221483 A1    Sep. 15, 2011

Related U.S. Application Data

(63) Continuation of application No. PCT/CN2010/074330, filed on Jun. 23, 2010.

(30) Foreign Application Priority Data

Jul. 8, 2009    (CN) .......................... 2009 1 0108718

(51) Int. Cl.
*H03L 7/00*    (2006.01)

(52) U.S. Cl.
USPC ............................. 327/143; 327/142; 327/198

(58) Field of Classification Search .................. 327/142, 327/143, 198
See application file for complete search history.

(56) References Cited

U.S. PATENT DOCUMENTS

| 2008/0180157 A1* | 7/2008 | Choi et al. ..................... 327/384 |
| 2010/0308876 A1* | 12/2010 | Kawasaki et al. ............. 327/143 |

FOREIGN PATENT DOCUMENTS

| CN | 1550948 | 12/2004 |
| CN | 101387896 | 3/2009 |
| CN | 201229545 | 4/2009 |
| JP | 2008-294208 | 12/2008 |

\* cited by examiner

*Primary Examiner* — John Poos
(74) *Attorney, Agent, or Firm* — Hamre, Schumann, Mueller & Larson, P.C.

(57) ABSTRACT

The present invention is applicable to the field of electrics and provides an integrated circuit (IC) and a standby controlling method thereof. The IC comprises a reset device, a standby control device, a functional device and a power supply control device. The functional device at least comprises a functional unit that does not operate in a standby mode. The power supply control device is configured to supply power to the functional device, the standby control device and the reset device. The standby control device is configured to control the power supply control device to control a power supply voltage of the functional unit to be within a preset range below a normal operating voltage when a standby status signal is detected, and restore the power supply voltage into the normal operating voltage when a wake-up signal is detected; and the reset device is configured to reset the functional device when the system standby status signal is detected and release the resetting of the functional device when the wake-up signal is detected. The IC of the present invention reduces the time required by the IC to wake up from the standby mode while ensuring that the whole functional device has low static power consumption.

10 Claims, 4 Drawing Sheets the IC 11 or be disposed
INTEGRATED CIRCUIT AND STANDBY CONTROLLING METHOD THEREOF

BACKGROUND OF THE INVENTION

1. Technical Field

The present invention relates to the field of electrics, and more particularly, to an integrated circuit (IC) and a standby controlling method thereof.

2. Description of Related Art

In the deep sub-micron technology, static current leakage of integrated circuits (ICs) becomes increasingly serious, and the standby power consumption has become a hot topic universally concerned worldwide.

A standby mode of an IC means that the IC has been connected to an external power supply but the main function thereof is not in operation. The standby mode of an IC comprises two cases: one is that in the standby mode, some circuits in the IC preserve the operation status of the system before the standby mode so that when being waked up, the system can be restored into the previous status within a certain time; and the other is that the IC has already been in a reset status and after being enabled, the system cannot be restored into the status previous to the standby mode. For an IC with a power supply integrated therein, an external power supply can only provide a proper power supply voltage to some circuits in the IC.

The static current and the power supply voltage of the IC are in the exponential relationship, so in the deep sub-micron technology, for purpose of solving the static current leakage problem of the IC in the standby mode, a conventional method is to power off circuit devices that do not need to operate in the standby mode and have static current leakage, i.e, to stop operation of voltage regulators that provide power supplies to these circuit devices when the IC is in the standby mode. When the IC in the standby mode is required to operate the main function thereof, the voltage regulators in the off status are instantly enabled to generate a required stable voltage.

When the IC operates the main function thereof, power supplies needed by internal devices thereof all operate normally, so the IC can make a rapid response to a variation of an input signal or an internal signal; however, the static power consumption in this case is higher. When the IC is in the standby mode, at least some of the voltage regulators and some of the functional devices in the system stop operating, so the standby power consumption is lower; however, because only after the voltage regulators that stop operating are re-started and are able to output a stable power supply can the IC operate the main function thereof, the IC in the standby mode makes a slower response to the variation of the input signal or the internal signal.

FIG. 1 shows a general architecture of an IC having the standby function according to the prior art, wherein the IC has a power supply integrated therein. The IC 11 comprises a power supply control device 111, a reset device 112 and a functional device 113, and is connected to an external power supply 12 and a wake-up device 13. When the IC 11 is in a normal operation status, the power supply control device 111 makes conversion on a power supply voltage outputted by the external power supply 12 and provides the functional device 113 with a required power supply, which may represent either one power supply or a plurality of power supplies. Meanwhile, a clock generator in the reset device 112 provides a clock signal to the functional device 113, and the clock generator may either be integrated in the IC 11 or be disposed outside the IC 11 (i.e., generated by an external clock circuit).

When the IC 11 enters into the standby mode from the normal operation status, the functional device 113 or an external circuit sends a system standby signal, which not only notifies the reset device 112 to generate a reset signal for resetting the functional device 113 and shield the clock signal but also turns off the power supply control device 111 (i.e., power off the functional device 113) in order to prevent static current leakage from occurring to the functional device 113. Of course, if the IC 11 requires one or more stable power supplies to still operate in the standby mode, then the system standby signal only turns off power supplies that do not need to operate in the standby mode; and in this case, although the standby power consumption of the IC 11 is somewhat increased, the functionality or performance of the IC 11 in the standby mode is significantly enhanced. When the IC 11 enters into the normal operation status from the standby mode, the wake-up device 13 generates a wake-up signal to start the power supply control device 111 instantly (i.e., re-start the power supplies that are turned off in the standby mode) to generate a required stable power supply. Meanwhile, the wake-up signal notifies the reset device 112 so that when the power supply generated by the power supply control device 111 comes into a stable status and a power supply stabilizing signal 94 is sent, the reset device 112 disables the reset signal and provides a clock signal to the functional device 113 to have the functional device 113 operate normally. The wake-up device 13 may either be disposed outside the IC 11 or be integrated in the IC 11.

A conventional standby method for the IC 11 is to reduce the static power consumption of the functional device 113 significantly by powering off all or some of the power supplies of the functional device 113 so as to ensure very low standby power consumption of the IC 11; however, when the IC 11 needs to be waked up (i.e., enter into the normal operation status from the standby mode), the functional device 113 can begin to operate normally only after the power supplies that are turned off in the standby mode are re-started and become stable, resulting a long wake-up time required by the IC 11.

BRIEF SUMMARY OF THE INVENTION

An objective of the present invention is to provide an integrated circuit (IC) and a standby controlling method thereof, which has low static power consumption and allow the IC to be waked up quickly from a standby mode to enter into a normal operation status.

This is implemented in the following way. An IC, comprising a reset device, a standby control device, a functional device and a power supply control device, the functional device at least comprising a functional sub-unit that does not operate in a standby mode, and the power supply control device being configured to supply power to the functional device, the standby control device and the reset device, wherein:

the standby control device is configured to control the power supply control device to control a power supply voltage of the functional sub-unit to be within a preset range below a normal operating voltage when a system standby signal is detected, and restore the power supply voltage into the normal operating voltage when a wake-up signal is detected; and the reset device is configured to reset the functional device when the system standby status signal is detected and release the resetting of the functional device when the wake-up signal is detected.

Another objective of the present invention is to provide a standby controlling method for an integrated circuit (IC), the IC comprising a functional device, a power supply control device and a standby control device, the functional device at least comprising a functional sub-unit that does not operate in a standby mode, the method comprising the following steps of:

1) receiving a system standby signal transmitted from the functional device or externally inputted; and 2) the standby control device controls the power supply control device to control a power supply voltage of the functional sub-unit to be within a preset range below a normal operating voltage when the system standby signal is detected, and restores the power supply voltage into the normal operating voltage when a signal of restoring to a normal operation status is detected.

When being in the standby mode, the IC according to the present invention maintains a functional sub-unit, that needs to operate in the standby mode, in the normal operation status and also controls an average power supply voltage of one or more functional sub-units that do not need to operate in the standby mode to be within a certain range, thus reducing the time required by the IC to wake up from the standby mode. Also, low static power consumption of the whole functional device can be ensured by setting an appropriate standby voltage range. Additionally, as the individual functional sub-units in the functional device have different operating voltages, a delay circuit may further be disposed in the reset circuit and delay times corresponding to a plurality of functional sub-units are preset in the delay circuit so that when a set delay time elapses, a corresponding one of the functional sub-units is started to operate, thereby further reducing the time required by the IC to be waked up from the standby mode.

DETAILED DESCRIPTION OF THE INVENTION

To make the objectives, technical solutions and advantages of the present invention more apparent, the present invention will be further described in detail with reference to the attached drawings and embodiments thereof. It shall be appreciated that, the embodiments described herein are only intended to explain the present invention but not to limit the present invention.

According to an embodiment of the present invention, when an integrated circuit (IC) is in a standby mode, not only a functional sub-unit that needs to operate in the standby mode is maintained in a powered-on status that supports normal operation but also an average power supply voltage of one or more functional sub-units that do not need to operate in the standby mode is controlled to be within a preset range below a normal operating voltage so as to ensure low static power consumption of the whole functional device.

Figure 1:
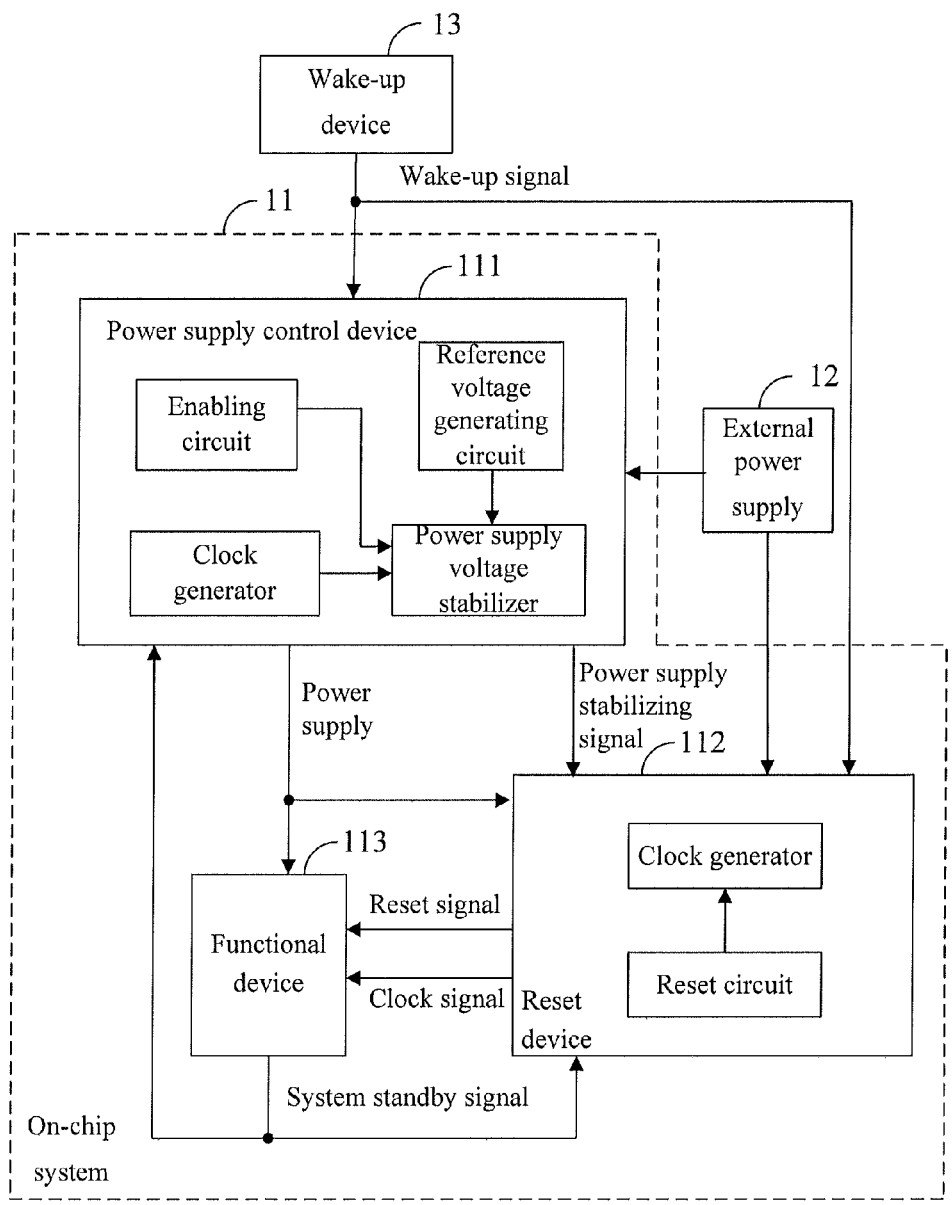
FIG. 1 is a schematic view of a general architecture of an integrated circuit having the standby function according to the prior art, wherein the integrated circuit has a power supply integrated therein.
Figure 2:
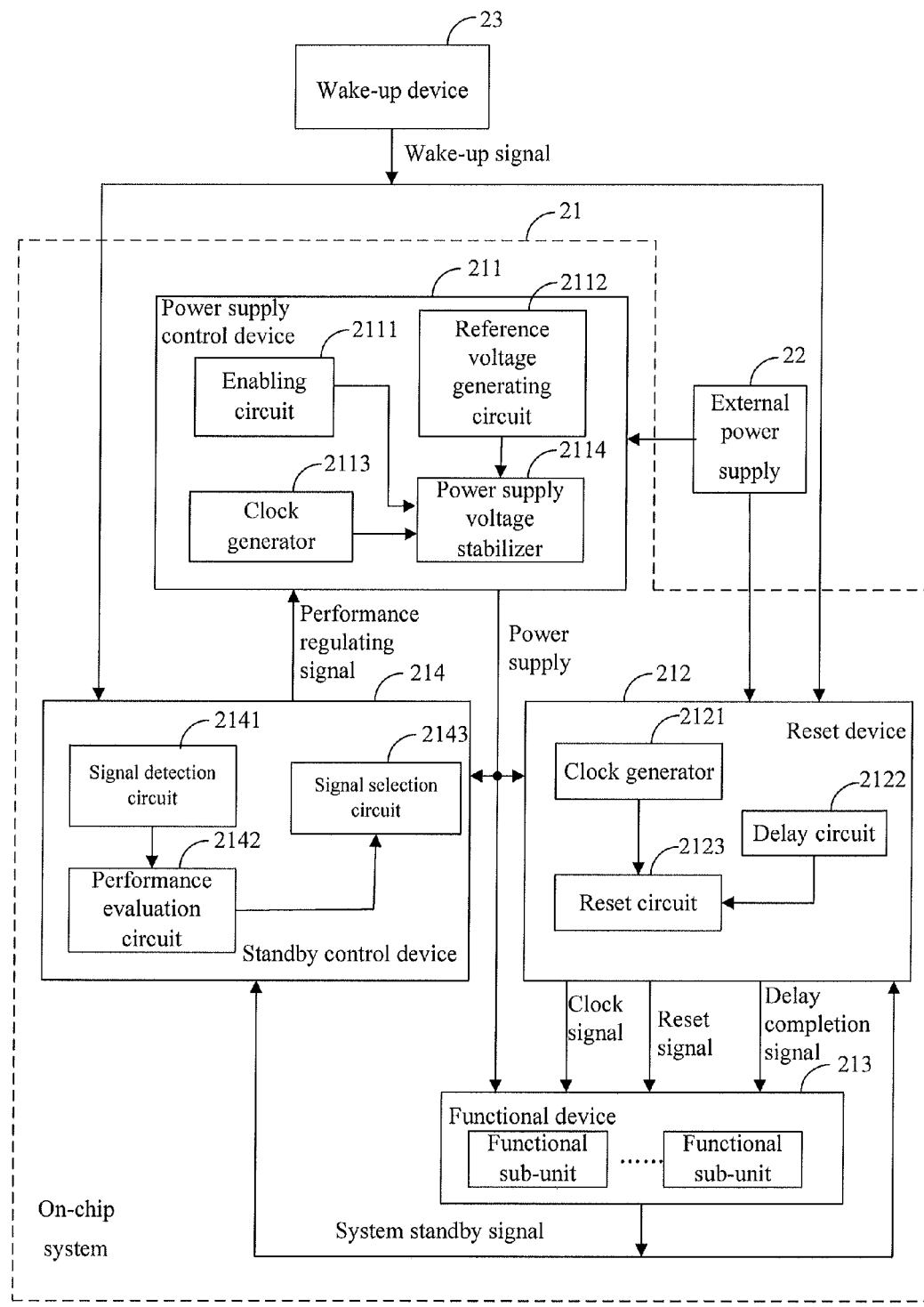
FIG. 2 is a schematic structural view of an integrated circuit according to an embodiment of the present invention.

FIG. 2 shows a structure of an IC according to an embodiment of the present invention. For ease of description, only parts related to the present invention are shown herein.

Referring to FIG. 2, the IC 21 comprises four parts, i.e., a power supply control device 211, a reset device 212, a functional device 213 and a standby control device 214. The IC 21 is connected to an external power supply 22 and a wake-up device 23. The external power supply 22 may be a battery or some other power supply generator, but can only provide a proper power supply voltage to some circuits in the IC 21. The functional device 213 is a device for implementing a particular function of the IC system such as encoding/decoding of an audio/video format, detection of battery power, and the like.

The power supply control device 211 is configured to provide a power supply voltage to the reset device 212, the functional device 213 and the standby control device 214. The power supply control device 211 comprises an enabling circuit 2111, a reference voltage generating circuit 2112, a clock generator 2113 and a power supply voltage stabilizer unit 2114. Once the external power supply 22 is connected to the IC 21, the enabling circuit 2111, the reference voltage generating circuit 2112 and the clock generator 2113 are instantly powered on to operate. More specifically, the enabling circuit 2111 controls to start the power supply voltage stabilizer unit 2114, the clock generator 2113 generates a clock signal required by the power supply voltage stabilizer unit 2114, and the reference voltage generating circuit 2112 generates a reference voltage required by the power supply voltage stabilizer unit 2114. Then, the power supply voltage stabilizer unit 2114 is started normally at the reference voltage (sometimes the clock signal is also needed) to generate a power supply voltage, and when a certain time elapses, the power supply control device 211 enters into a stable status.

The reset device 212 resets the functional device 213 when the system is started and, when the power supply voltage provided by the power supply control device 211 to the functional device 213 reaches a preset value, releases the resetting so that a clock signal required by the functional device 213 is outputted. As shown in FIG. 2, the reset device 212 comprises a clock generator 2121 and a reset circuit 2123. The clock generator 2121 and the reset circuit 2123 are powered by the power supply voltage generated by the power supply voltage stabilizer unit 2114 of the power supply control device 211, and alternatively, the reset circuit 2123 may also be powered by an external power supply. Further, the reset device 212 further comprises a delay circuit 2122. Likewise, the delay circuit 2122 may be powered by the external power supply 22 directly or by the power supply voltage stabilizer unit 2114 (e.g., when the system is being waked up). When the system is in the standby mode, the reset circuit 2123 generates a reset signal to reset the functional device 213 and shields the clock signal generated by the clock generator 2121 (i.e., does not transmit the clock signal to the functional device 213) so as to prevent the functional device 213 from beginning to operate early during starting of an on-chip power supply control device 12 to cause malfunction. Of course, in the standby mode, if some functional sub-units still need to operate, then the reset signal generated by the reset circuit 2123 will not reset these functional sub-units and the clock signal required by these functional sub-units will not be shielded either. If none of the functional sub-units requires the clock signal in the standby mode, then the clock generator can be turned off to reduce power consumption. When the power supply voltage outputted by the power supply voltage stabilizer unit 2114 rises to such an extent that the clock generator 2121 is enabled to operate, the clock generator 2121 begins to generate the clock signal required by the functional device 213. When the external power supply 22 is connected to the IC 21, the delay circuit 121 begins to operate. After a set delay time elapses, the delay circuit 2122 sends a control signal to the reset circuit 2123 so that the reset circuit 2123 stops outputting the reset signal to the functional device 213 and then transmits the clock signal generated by the clock generator 2121 to the functional device 213, which then begins to operate. That is, the time from the time point when the external power supply 22 is connected to the IC 21 to the time point when the functional device 213 begins to operate is controlled completely by the delay circuit 2122, and the functional device 213 can begin to operate as soon as the delay time set for the delay circuit 2122 elapses.

In the embodiment of the present invention, the standby control device 214 is configured to: when a system standby signal of the functional device 213 or the external circuit is received, control the power supply control device 211 to output a standby status voltage so that the functional sub-unit that needs to operate in the standby mode is maintained in a powered-on status that supports normal operation and an average power supply voltage of one or more functional sub-units that do not need to operate in the standby mode is controlled to be within a preset range below a normal operating voltage; and when a wake-up signal is received, control the power supply control device 211 to output a normal operation status voltage to have the functional device 213 operate normally.

As shown in FIG. 2, the standby control device 214 comprises a signal detection circuit 2141, a performance evaluation circuit 2142 and a signal selection circuit 2143. When the IC 21 enters into the standby mode from the normal operation status, the functional device 213 or the external circuit sends the system standby signal to the reset device 212 so that the reset device 212 is notified to generate the reset signal to reset the functional device 213 and shield the clock signal. Meanwhile, in order to reduce the static current of the functional device 213, the functional device 213 or the external circuit further sends the system standby signal to the performance evaluation circuit 2142 of the standby control device 214. After receiving the system standby signal, the performance evaluation circuit 2142 controls the signal selection circuit 2143 to send a power supply voltage regulating signal to the power supply control device 211 so that the power supply control device 211 outputs the standby status voltage. As described above, at this point, not only the functional sub-unit that needs to operate in the standby mode is maintained in the powered-on status that supports normal operation, but also an average power supply voltage of one or more functional sub-units that do not need to operate in the standby mode is controlled to be within the preset range below the normal operating voltage. This ensures that the functional circuit 51 has low static power consumption and can be waked up rapidly.

When the IC 21 is required to enter into the normal operation status from the standby mode, the wake-up device 23 sends the wake-up signal, which is transmitted to the reset device 212 instantly so that the delay circuit 2122 begins to operate. Meanwhile, the wake-up signal is further transmitted to the signal detection circuit 2141 of the standby control device 214, which then processes and sends the wake-up signal to the performance evaluation circuit 2142. When the performance evaluation circuit 2142 determines that the performance of the power supply voltage of the power supply control device 211 in the standby mode cannot have the functional device 213 operate normally, the performance evaluation circuit 2142 sends a performance regulating signal by means of the signal selection circuit 2143 immediately so that the performance of the power supply voltage outputted by the power supply control device 211 is improved to meet the requirement of the functional device. Because, in the standby mode, the average voltage of one or more functional sub-units that do not need to operate in the standby mode of the functional device 213 in the standby mode is not zero, the time required to wake up the IC 21 from the standby mode is shorter than that required by a conventional standby method.

Further, the functional device 213 comprises a plurality of functional sub-units that have different operating voltages, and each of the functional sub-units may be a digital circuit, an analog circuit or a mixed digital-analog circuit for implementing the functions of the IC 21. When the external power supply 22 is connected to the IC 21, the reset circuit 2123 resets the functional sub-units of the functional device 213 that do not need to operate. The power supply control device 211 provides the functional device 213 with the power supply voltage and the reference voltage that are required for operation. Corresponding to the functional sub-units in the functional device 213, the delay circuit 2122 has a plurality of delay times set therein. During waking up of the system, after the delay circuit 2122 generates a first delay completion signal, the reset circuit 2123 sends the clock signal generated by the clock generator 2121 to a first functional sub-unit so that the first functional sub-unit begins to operate normally; and after the delay circuit 2122 generates a second delay completion signal, the reset circuit 2123 sends the clock signal generated by the clock generator 2121 to a second functional sub-unit so that the second functional sub-unit begins to operate normally. That is, the functional device 213 needs not to wait until the on-chip power supply control device 211 becomes completely stable before beginning to operate; rather, depending on properties of the individual functional sub-units in the functional device 213, the individual functional sub-units may be controlled to begin to operate in sequence by the delay circuit 2122 as the power supply voltage outputted by the power supply control device 211 rises, thereby further reducing the time required to wake up the IC 50 from the standby mode.

Figure 3:
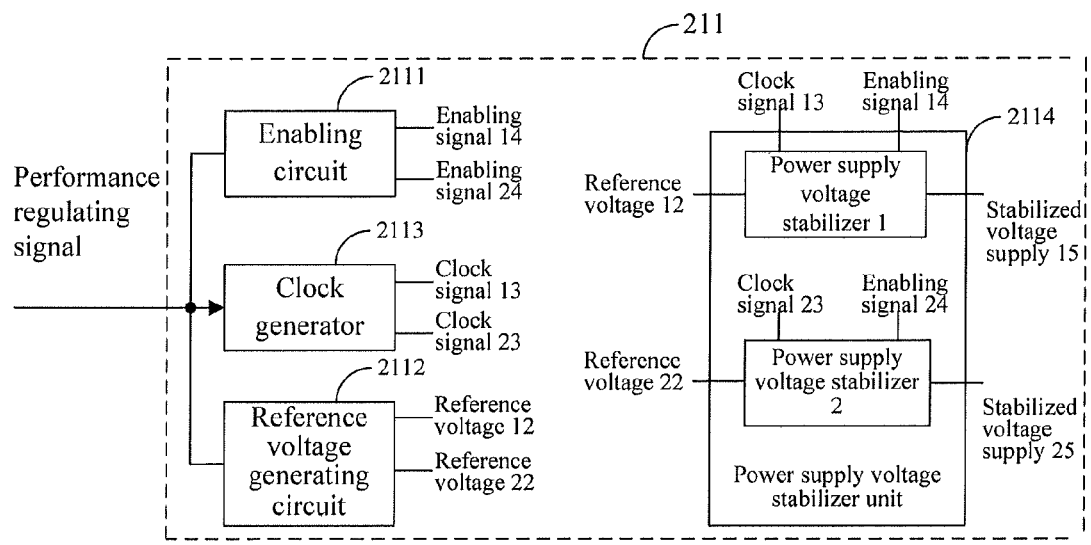
FIG. 3 shows an example of a power supply control device in FIG. 2.
Figure 4:
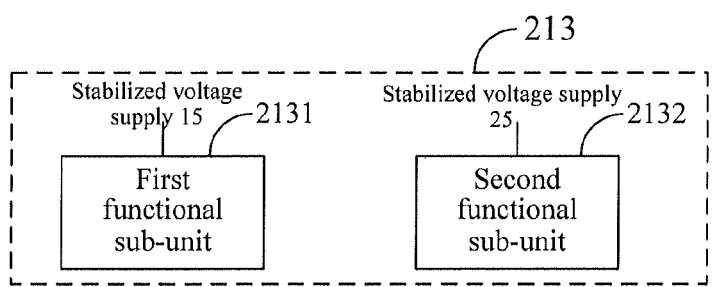
FIG. 4 shows an example of a functional device in FIG. 2.

FIG. 3 and FIG. 4 are schematic structural views of the power supply control device 211 and the functional device 213 in FIG. 2 respectively. The power supply control device 211 comprises the enabling circuit 2111, the clock generator 2113, the reference voltage generating circuit 2112, and the power supply voltage stabilizer unit 2114 consisting of a power supply voltage stabilizer 1 and a power supply voltage stabilizer 2. The enabling circuit 2111, the clock generator 2113 and the reference voltage generating circuit 2112 provide an enabling signal, a clock signal and a reference voltage to the power supply voltage stabilizer 1 and the power supply voltage stabilizer 2 respectively. The functional device 213 comprises a first functional sub-unit 2131 and a second functional sub-unit 2132, and the first functional sub-unit 2131 uses a stabilized voltage supply 15 generated by the power supply voltage stabilizer 1 as its power supply and the second functional sub-unit 2132 uses a stabilized voltage supply 25 generated by the power supply voltage stabilizer 2 as its power supply.

Figure 5:
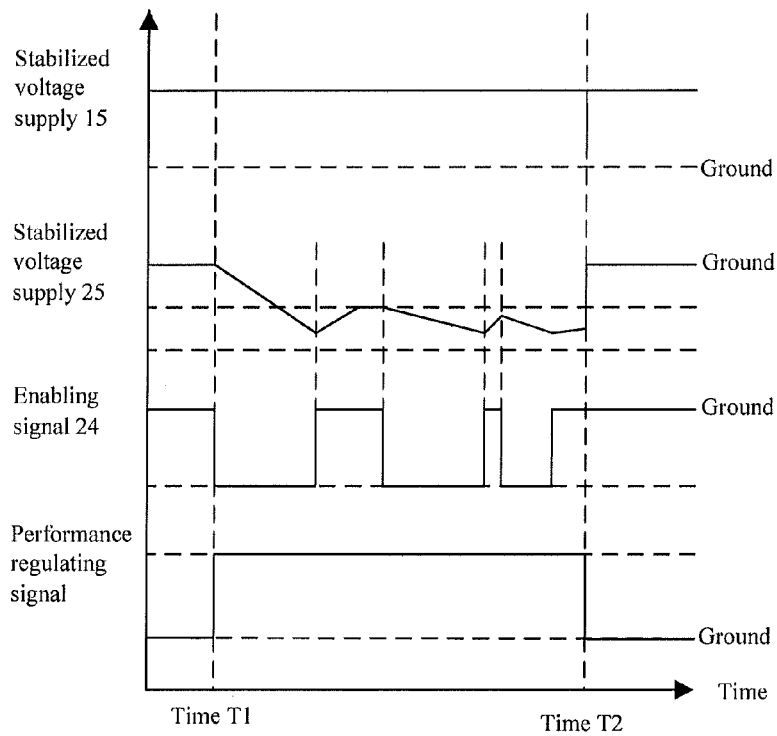
FIG. 5 is a schematic waveform diagram of a signal generated by the power supply control device shown in FIG. 3.

In FIG. 3 and FIG. 4, when a performance regulating signal generated by the standby control device 214 notifies the power supply control device 211 to enter into the standby mode, the performance regulating signal, the reference voltage 22, the enabling signal 24, the stabilized voltage supply 15 and the stabilized voltage supply 25 have waveforms as shown in FIG. 5. At the time T1, the IC 21 enters into the standby mode from the normal operation status, and the stabilized voltage supply 15 generated by the power supply voltage stabilizer 1 keeps unchanged in the two statuses so as to ensure that the first functional sub-unit 2131 can still operate normally in the standby mode; The enabling signal 24 keeps at a high level when the IC 21 operates normally, but becomes a signal alternating between a high level and a low level in the standby mode. When the enabling signal 24 is at a high level, the power supply voltage stabilizer 2 is in an operation status so that the voltage of the stabilized voltage supply 25 increases; and when the enabling signal 24 is at a low level, the power supply voltage stabilizer 2 stops operating so that the voltage of the stabilized voltage supply 25 decreases slowly due to the effect of a load. That is, when the enabling signal 24 is at a high level, a voltage value of the stabilized voltage supply 25 is boosted under the control of the clock signal 23 and the reference voltage 22 so that the voltage value increases until reaching a set voltage value; and when the enabling signal 24 is at a low level, the power supply voltage stabilizer 2 stops operating so that the voltage value of the stabilized voltage supply 25 decreases slowly due to the effect of the static power consumption of the second functional sub-unit 2132. Additionally, the maximum voltage value of the stabilized voltage supply 25 in the standby mode is limited to be smaller than a voltage value in normal operation. This further reduces the static power consumption of the second functional sub-unit 2132 because the static power consumption of the second functional sub-unit 2132 is approximately in exponential relationship with the voltage value of the stabilized voltage supply 25. Of course, the voltage value of the stabilized voltage supply 25 in the standby mode may not be limited, and as long as the time when the enabling signal 24 becomes a high level is properly designed, it may also be ensured that the static power consumption of the second functional sub-unit 2132 is low. At the time T2, the wake-up device 23 sends a wake-up signal so that the standby control device 214 turn the performance regulating signal into a high level. In this way, the reference voltage 22 and the enabling signal 24 can be rapidly restored into the same values as when the IC 21 operates normally so that the stabilized voltage supply 25 increases to the normal value to ensure that the functional device 213 operates in the normal operation status. It shall be appreciated that, in practical implementations, the manners in which the power supply varies may be set flexibly as desired; e.g., a clock signal having a fixed or variable preset duty cycle is employed to modulate the power supply voltage(s) of one or more functional sub-units that do not need to operate in the standby mode so that an average voltage falls within the preset range.

Figure 6:
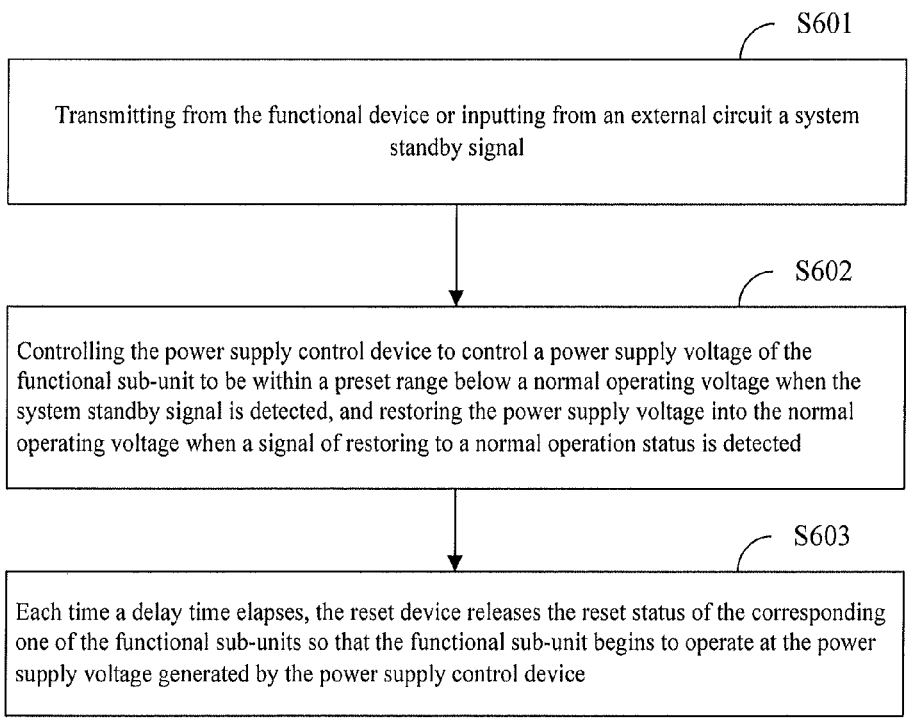
FIG. 6 is a flowchart of a method that allows for low standby power consumption and rapid wake-up of the integrated circuit according to an embodiment of the present invention.

FIG. 6 is a flowchart of a method that allows an IC to have low standby power consumption and to be waked up rapidly according to an embodiment of the present invention. The IC comprises a functional device having a plurality of functional sub-units, a power supply control device, a reset device and a standby control device. Specific steps of the method are as follows:

In step S601, a system standby signal is transmitted by the functional device or inputted from an external circuit.

In step S602, the standby control device controls the power supply control device to control a power supply voltage of the functional sub-unit to be within a preset range below a normal operating voltage when the system standby signal is detected, and restore the power supply voltage into the normal operating voltage when a signal of restoring to a normal operation status is detected.

The power supply control device employs a clock signal having a fixed or variable preset duty cycle to modulate the power supply voltage(s) of one or more functional sub-units that do not need to operate in the standby mode so that an average voltage thereof is controlled to be within the preset range, or to control the maximum value of the power supply voltage(s) thereof to be within the preset range below the normal operating voltage.

In step S603, each time a delay time elapses, the reset device releases the reset status of the corresponding one of the functional sub-units so that the corresponding functional sub-unit begins to operate at the power supply voltage generated by the power supply control device.

In the embodiment of the present invention, the functional device of the IC comprises a plurality of functional sub-units that have different operating voltages. Correspondingly, the delay circuit has preset therein delay times corresponding to a plurality of the functional sub-units so that, when a set delay time elapses, the corresponding functional sub-unit is started to operate.

When being in the standby mode, the IC according to the present invention maintains a functional sub-unit that needs to operate in the standby mode powered on and, also, prevents one or more functional sub-units that do not need to operate in the standby mode from being powered down (of course, the one or more functional sub-units may also be in a powered-down status in a certain time period) to control an average power supply voltage of the one or more functional sub-units to be within the preset range below the normal operating voltage. This reduces the time required to wake up the IC from the standby mode while still ensuring that the whole functional device has low static power consumption. Additionally, as the individual functional sub-units in the functional device have different operating voltages, a delay circuit is disposed in the reset circuit and delay times corresponding to a plurality of the functional sub-units are preset in the delay circuit so that, when a set delay time elapses, the corresponding one of the functional sub-units is started to operate, thereby further reducing the time required to wake up the IC from the standby mode.

What described above are only preferred embodiments of the present invention but are not intended to limit the present invention. All modifications, equivalent displacements and improvements that are made without departing from the spirit and principles of the present invention shall still fall within the scope of the present invention.

The invention claimed is:

1. An integrated circuit (IC), comprising a reset device, a standby control device, a functional device and a power supply control device, the functional device at least comprising a functional sub-unit that does not operate in a standby mode, the power supply control device being configured to supply power to the functional device, the standby control device and the reset device, wherein:

the standby control device is configured to control the power supply control device to control a power supply voltage of the functional sub-unit to be within a preset range below a normal operating voltage when a system standby signal is detected, and restore the power supply voltage into the normal operating voltage when a wake-up signal is detected; and the reset device is configured to reset the functional device when the system standby signal is detected and release the resetting of the functional device when the wake-up signal is detected.

2. The IC of claim 1, wherein the standby control device controls a maximum value of the power supply voltage of the functional sub-unit in the standby mode to be within the preset range below the normal operating voltage.

3. The IC of claim 1, wherein the standby control device comprises:
   a signal detection circuit, a performance evaluation circuit and a signal selection circuit;
   wherein the signal detection circuit is configured to receive a wake-up signal and process the wake-up signal for output to the performance evaluation circuit; and
   wherein the performance evaluation circuit is configured to receive the system standby signal and then control the signal selection circuit to send a power supply voltage regulating signal to the power supply control device so that the power supply control device is controlled to control the power supply voltage of the functional sub-unit to be within the preset range below the normal operating voltage, and when the wake-up signal is received by the signal detection circuit, control the power supply control device to improve the performance of the power supply voltage by means of the signal selection circuit so as to restore the power supply voltage into the normal operating voltage.

4. The IC of claim 1, wherein the functional device comprises a plurality of functional sub-units that have different operating voltages and do not operate in the standby mode, the reset device has preset therein delay times corresponding to all or some of the functional sub-units, and each time a delay time elapses, the reset device releases the reset status of the corresponding one of the functional sub-units so that the functional sub-unit begins to operate at the power supply voltage generated by the power supply control device.

5. The IC of claim 4, wherein the reset device comprises:
   a delay circuit connected to an external power supply or a power supply voltage stabilizer unit, the delay circuit having one or more delay times preset therein;
   a clock generator for generating a clock signal; and
   a reset circuit connected to the clock generator and the delay circuit, being configured to output a reset signal to the functional device and shield the clock signal generated by the clock generator during a delaying process of the delay circuit and, after the delaying process is completed by the delay circuit, stop outputting the reset signal and transmit the clock signal generated by the clock generator to the functional device.

6. A standby controlling method for an integrated circuit (IC), the IC comprising a functional device, a power supply control device and a standby control device, the functional device at least comprising a functional sub-unit that does not operate in a standby mode, the method comprising the following steps of:

1) transmitting from the functional device or externally inputting a system standby signal; and
2) controlling, via the standby control device, the power supply control device to control a power supply voltage of the functional sub-unit to be within a preset range below a normal operating voltage when the system standby signal is detected, and restores the power supply voltage into the normal operating voltage when a signal of restoring to a normal operation status is detected.

7. The method of claim 6, wherein the power supply control device employs a clock signal having a preset fixed or variable duty cycle to control an average value of the power supply voltage of the functional sub-unit to be within the preset range below the normal operating voltage.

8. The method of claim 6, wherein the standby control device controls a maximum value of the power supply voltage of the functional sub-unit to be within the preset range below the normal operating voltage.

9. The method of claim 6, wherein the functional device comprises a plurality of functional sub-units that have different operating voltages and do not operate in the standby mode, and the reset device has preset therein delay times corresponding to all or some of the functional sub-units, the method further comprising the following step of:
   3) each time a delay time elapses, the reset device releases the reset status of the corresponding one of the functional sub-units so that the functional sub-unit begins to operate at the power supply voltage generated by the power supply control device.

10. An integrated circuit (IC), comprising a reset device, a standby control device, a functional device and a power supply control device, the functional device at least comprising a functional sub-unit that does not operate in a standby mode, the power supply control device being configured to supply power to the functional device, the standby control device and the reset device, wherein:
   the standby control device is configured to control the power supply control device to control a power supply voltage of the functional sub-unit to be within a preset range below a normal operating voltage when a system standby signal is detected, and restore the power supply voltage into the normal operating voltage when a wake-up signal is detected,
   the reset device is configured to reset the functional device when the system standby signal is detected and release the resetting of the functional device when the wake-up signal is detected, and
   the standby control device employs a clock signal having a preset fixed or variable duty cycle to control an average value of the power supply voltage of the functional sub-unit to be within the preset range below the normal operating voltage.

* * * * *